May 3, 1966 V. N. ALBERTSON 3,249,020
PUMP OR MOTOR
Filed Oct. 8, 1962 3 Sheets-Sheet 1
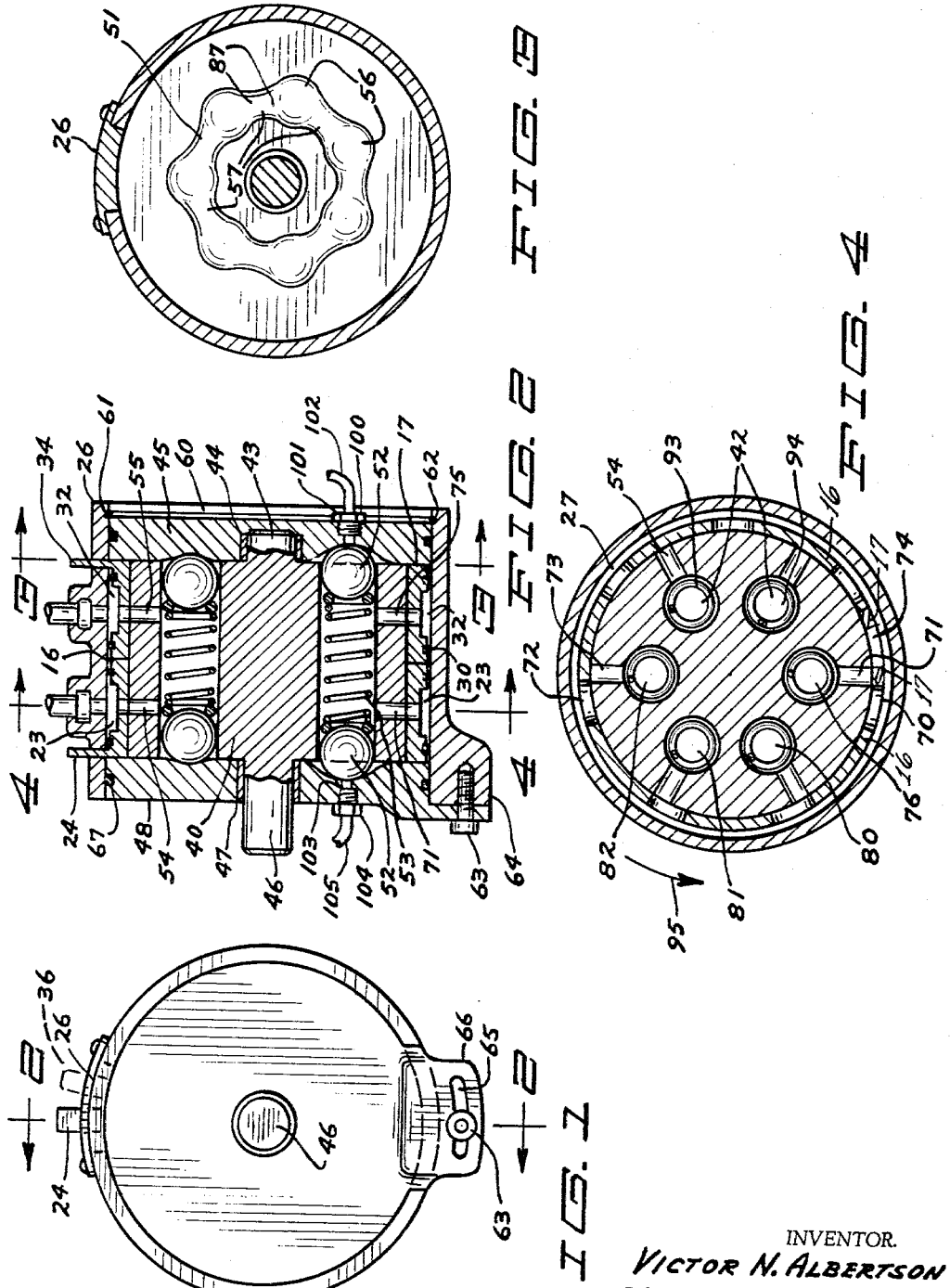
INVENTOR.
VICTOR N. ALBERTSON
BY
Dugger, Braddock, Johnson & Westman
ATTORNEYS

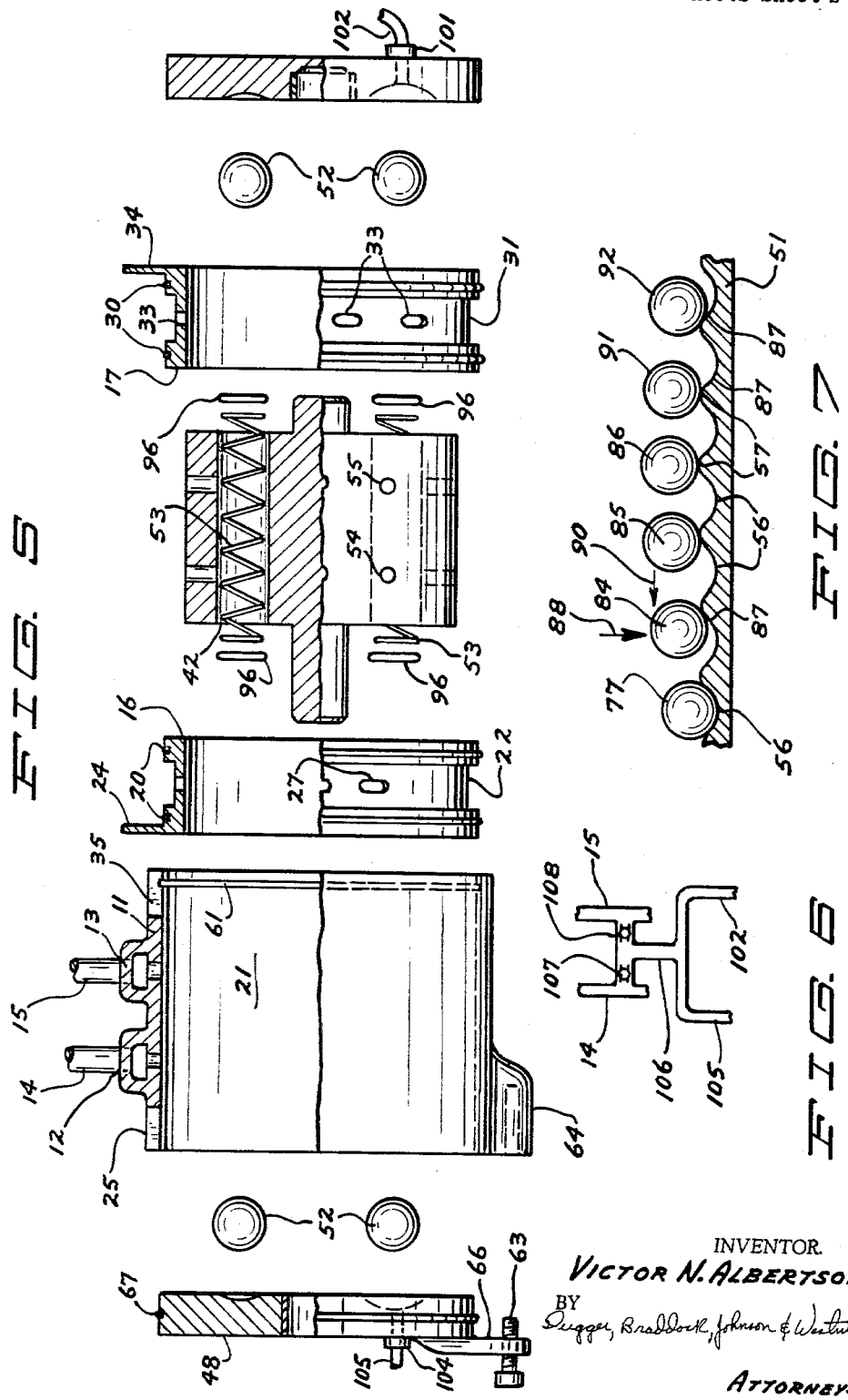

May 3, 1966 V. N. ALBERTSON 3,249,020
PUMP OR MOTOR
Filed Oct. 8, 1962 3 Sheets-Sheet 3
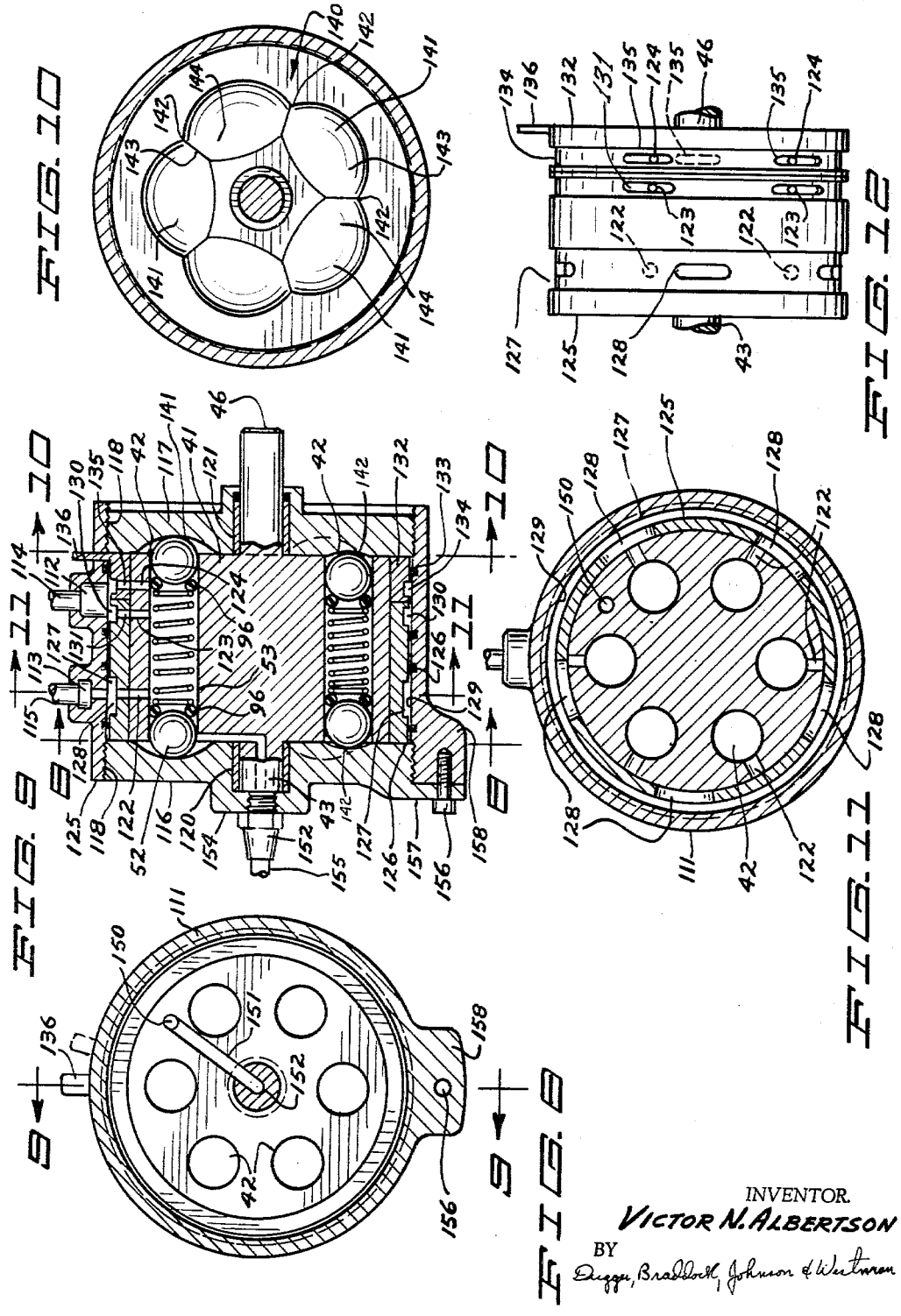
INVENTOR.
VICTOR N. ALBERTSON
BY
Diggs, Braddock, Johnson & Westman
ATTORNEYS

United States Patent Office 3,249,020
Patented May 3, 1966

3,249,020
PUMP OR MOTOR
Victor N. Albertson, 4349 Browndale Ave.,
Minneapolis 24, Minn.
Filed Oct. 8, 1962, Ser. No. 229,012
15 Claims. (Cl. 91—198)

The present invention has relation to fluid devices and more particularly to a fluid device which will operate as a fluid motor or pump.

Presently there are a wide variety of different types of fluid motors on the market. However, the need still exists for a high quality, serviceable and low cost, easily manufactured motor which will deliver a high torque at relatively slow speeds and can be controlled both as to torque and speed. The most successful of these devices utilizes a central shaft having a plurality of cam lobes and with an orbital annular member around the cam lobes which, when subjected to pressure, creates a rotational driving force with respect to the lobes.

The orbital type motors have a large amount of radial thrust which causes excessive wear on support bearings as well as scoring and galling of the outer case in which the outer member turns.

The device of the present invention eliminates radial thrust on the actuating member and is simply constructed to reduce manufacturing costs.

The fluid device of the present invention includes an outer housing having a pair of annular commutator rings mounted therein. The annular commutator rings are loosely fit inside the housing and are held in place through the use of annular resilient rings, or O rings.

A cylinder assembly is rotatably mounted within the commutators and has a plurality of longitudinally extending holes or power cylinders therein. Each of the holes has a pair of piston-like balls mounted for longitudinal movement therein. Each of the balls is positioned to engage a cam surface integral with an adjacent end plate of the fluid device and, as the balls move along, the reaction between the end plates and the balls forces the cylinder assembly to rotate with respect to the end plates. The balls are actuated through the use of fluid pressure introduced into the power cylinders through the commutator rings. The power cylinder or holes in the cylinder assembly are alternately subjected to pressure and open to exhaust ports so that the balls can move back and forth in their power cylinders as necessary to obtain a power output from the motor.

It is an object of the present invention to present a fluid device which will operate as a motor to give a high output torque.

It is a further object of the present invention to present a fluid motor in which radial thrust is virtually eliminated.

It is a still further object of the present invention to present a fluid motor which utilizes balls moving under pressure across a cam track to create a rotational force.

It is a further object of the present invention to present a fluid motor wherein the output torque and speed can be varied.

It is a still further object of the present invention to present a fluid device that can be used either as a motor or as a pump.

Other and further objects are those inherent to the invention herein illustrated, described, and claimed, and will become apparent as the description proceeds.

To the accomplishment of the aforegoing and related ends, this invention then comprises features hereinafter fully described and particularly pointed out in the claims, following description setting forth in detail certain illustrative embodiments of the invention, these being indicative, however, of but a few of the various ways in which the principles of the invention may be employed.

The invention is illustrated with reference to the drawings wherein:

FIG. 1 is an end elevational view of a fluid device made according to the present invention;

FIG. 2 is a sectional view taken as on line 2—2 in FIG. 1;

FIG. 3 is a sectional view taken as on line 3—3 in FIG. 1;

FIG. 4 is a sectional view taken as on line 4—4 in FIG. 2;

FIG. 5 is an exploded view of the device of FIG. 1 with parts in section and parts broken away;

FIG. 6 is a schematic representation of a hydraulic circuit utilized to provide a bleed for oil trapped in the working parts of the fluid device in FIG. 1;

FIG. 7 is a schematic linear representation of the annular cam track illustrated in FIG. 3 showing actuating balls in position on the track;

FIG. 8 is an end elevational view of a fluid device made according to a second form of the present invention and taken as on line 8—8 in FIG. 9;

FIG. 9 is a vertical sectional view of the device of FIG. 8 taken as on line 9—9 in FIG. 8;

FIG. 10 is a sectional view taken as on line 10—10 in FIG. 9;

FIG. 11 is a sectional view taken as on line 11—11 in FIG. 9; and

FIG. 12 is a side elevational view of a commutator and cylinder assembly made according to a second form of the invention.

Referring to FIGS. 1 through 7 and the numerals of reference thereon, a fluid device 10 which, for convenience of terminology, will be referred to as motor throughout the specification, but is to be understood that the device will work as a pump also, if desired, includes an outer housing 11 which is tubular in shape. The outer housing 11 has a pressure port 12 and an exhaust port 13 which are both open to the interior of the housing. A pressure line 14 is connected to the pressure port 12 and an exhaust or return line 15 is connected to the exhaust port 13. Again, for convenience in description, the lines will be referred to as a pressure line and a return line but it is to be understood that they can be reversed in operation if desired.

An annular pressure commutator ring 16 is slidably mounted within the interior of outer housing 11 adjacent a first end thereof. An annular return commutator ring 17 is slidably mounted within the outer housing 11 adjacent a second end thereof. The pressure and return commutator rings are separate and abut each other in the center of the outer housing.

The pressure commutator 16 has a pair of O rings 20, 20 mounted therein and which engage the interior surface 21 of the outer housing 11. The outer surface of the commutator ring 16 is spaced from the interior surface 21 of the outer housing and the O rings engage the surface and hold the pressure commutator centered and positioned within the outer housing. The pressure commutator comprises a depressed central portion 22 which forms an annular pressure passageway 23 when the commutator ring is placed within the outer housing 11. The passageway is open to pressure port 12 and fluid under pressure introduced through line 14 will act evenly all the way around the commutator ring. This even pressure around the commutator ring helps in keeping the ring centered within the outer housing 11. The pressure commutator ring 16 has a plurality of valve slot openings 27 therethrough. The openings connect passageway 23 with the interior of the commutator and are evenly spaced and annularly aligned.

The pressure commutator ring 16 has an adjustment handle 24 which is integral with one side edge thereof and extends outwardly through a provided opening 25 in the outer housing 11. A cap 26 is inserted in the opening and is fastened to the outer housing to provide a continuous seal around the housing. Suitable sealing means for the cap are also used.

The return or exhaust commutator 17 also slidably fits within the outer housing 11 and has a pair of O rings 30, 30 which seal the ring with respect to the outer housing. A depressed central portion 31 of the ring provides an annular passageway 32 within the outer housing for flow of oil through provided slotted valve openings 33 through the exhaust port 13.

The exhaust commutator 17 has an adjustment handle 34 integral therewith and adjacent one end thereof, which extends through an opening 35 in the opposite end of outer housing 11 from opening 25. A cap 26 is also placed in this opening and holds the handle in position after the unit has been assembled.

The O rings 30, 30 of the return commutator 17 seat against the interior surface 21 of the outer housing 11 to form a pressure tight passageway 32. Thus the pressure and exhaust passageways are sealed from each other and form individual flow paths. Also, through the use of the adjustment handles 24 and 34 the two commutators can be rotated with respect to each other through a limited distance. For example, the handle 24 can be moved to position as shown in dotted lines at 36 in FIG. 1. A cylinder assembly 40 is rotatably mounted with respect to the commutators. The cylinder assembly 40 fits the commutators closely. The cylinder assembly consists of a central cylindrical member 41 which has a plurality of longitudinally extending openings or power cylinders 42 defined therein. The power cylinders 42 are arranged the same distance radially outward from the center of rotation of the cylinder and equally spaced apart. A stub shaft 43 is integral with the cylinder member 41 and is rotatably mounted in a bearing 44 which in turn is mounted in a first end cap 45. A power shaft 46 is integral with the cylinder member 41 and is rotatably mounted in a bearing 47 which in turn is mounted in a second end cap 48. The power shaft 46 extends through the end cap and can be connected to a work unit, if desired.

A pair of piston-like balls 52 is slidably mounted in each of the power cylinders 42 and are urged apart in a longitudinal direction with respect to the power cylinder with a compression coil spring 53. The balls at opposite ends of each of the power cylinder abut against the adjacent end cap of the fluid motor.

Each of the power cylinders 42 has a power cylinder pressure port 54 and power cylinder exhaust port 55 provided therein. The power cylinder pressure and exhaust ports extend radially outwardly to the outer surface of the power cylinders and are aligned with the openings in the pressure and exhaust commutators, respectively.

Each of the end caps has a cam track 51, as perhaps best seen in FIG. 3 which illustrates the cam track 51 for the first end cap 45. As can be seen the cylinder assembly 40 has six longitudinally extending power cylinders 42. The cam track in each of the end caps has seven operating lobes in the first form of the invention. As can be seen, the lobes are formed by seven cam low points illustrated at 56 and seven cam high points illustrated at 57. Adjacent high and low points are joined together by inclined surfaces 87. The center line of the cam track, which is annular, is on the same radius as the centers of the power cylinders 42 and is concentric with the axis of cylinder assembly 40. Thus the balls, which engage the end caps, engage the cam track when they are under pressure.

It can also be seen that the first end cap 45 is held in place within the outer housing with a snap ring 60 which fits inside a provided groove 61 in the inner surface 21 of the outer housing. Further an O ring 62 is positioned to prevent leakage between the end cap and the outer housing. The second end cap 48 is held in position through the instrumentality of a cap screw 63 which is threaded into a provided boss 64 on the outer housing. The cap screw extends through a slot 65 in an ear 66 which is integral with the end cap 48. By loosening the screw, the second end cap can be rotated with respect to the first end cap along the length of slot 65. Further, the second end cap 48 is sealed with an O ring 67 which seats against the inner surface 21 of the outer housing. If desired or necessary additional fastening means for the second end cap 48 can be provided to absorb the thrust from the balls during the power stroke.

As stated previously the pressure commutator 16 and the exhaust or return commutator 17 each have a plurality of valve slots or openings 27 and 33, respectively, extending therethrough. The slots or openings act as valves to subject the power cylinders to pressure and open them to the exhaust line. As shown in FIG. 4 each of the commutator rings have seven openings arranged around the periphery thereof. The openings in the commutators correspond in number to the number of cam lobes in each of the end caps. The openings in the commutators are timed or spaced so that, as shown in FIG. 4 which illustrates the pressure commutator, when an opening 70 is just moving past pressure port 71 for a power cylinder 76 and pressure port 71 is closed an opening 72 is positioned so that it starts to uncover a port 73 and pressure is thereby introduced to port 73 at a power cylinder 82 diametrically opposite from the power cylinder 76, where the pressure is shut off. Thus it will be seen in FIG. 4 that when three of the cylinders 42 are being subjected to pressure the other three have the pressure port sealed off. Ideally the exhaust commutator is set so that as soon as the pressure to a cylinder is sealed off, the exhaust port will open. In other words when opening 70 in the pressure commutator closes off the pressure to port 71 an opening 74 illustrated in dotted lines in FIG. 4 will be opening to the exhaust port 75 which is aligned therewith and open to the power cylinder 76. This will permit oil to escape from the cylinder 76. Then too, the cylinder in which the pressure ports are closed will have the exhaust ports open so oil can flow out of these power cylinders.

When pressure is introduced into any one of the power cylinders 42 through the pressure line 14, port 12 and passageway 23 and then through the openings 27, the balls 52 in the power cylinder subjected to pressure are forced against the two end caps with equal force. As the balls ride on the cam track what occurs will depend on the position of the ball when it is subjected to pressure.

For example, referring to FIGS. 3, 4 and 7, it will be seen that with pressure port 71 of power cylinder 76 just being closed, the ball illustrated at 77 will be fully seated in the low point of a cam. While FIG. 7 illustrates only one ball and cam assembly it should be remembered that for ideal conditions the action of both balls in each of the cylinders should be identical on their respective cams. This can be seen in FIG. 2 wherein the lower power cylinder balls are both at low points of their cams and the upper power cylinder balls are at high points.

Also, as can be seen in FIG. 4, pressure will be introduced into the power cylinders 80 and 81 and will just be starting to be introduced into power cylinder 82. The balls in these cylinders will be positioned as shown at 84, 85 and 86, respectively, in FIG. 7. It can be seen that balls 84 and 85 are starting to move down an inclined portion 87 of the cam and pressure acting in the power cylinder 80 tending to move the ball in the direction of arrow 88 will cause a force to be exerted transverse to the direction of arrow 88. For example, a force will be exerted on the cylinder assembly 40 in the direction of arrow 90. This will tend to rotate the cylinder assembly. Also the same will be true at the ball 85. Ball 86 is just starting to move down the incline and a very low rotational force will result from this ball but as the cylinder rotates the rotational force exerted by the ball 86 will increase. The balls 91 and 92 are positioned in cylinders 93 and 94, respectively, and, as can be seen in FIG. 4, the pressure ports for these cylinders are closed. However, the exhaust ports are open to these two cylinders and therefore the balls will be moved up the inclined portions 87 of their respective cams and will force oil out of their power cylinders 93 and 94. As the exhaust commutator openings are properly positioned the oil can move out of these power cylinders back to a reservoir freely.

Assuming that FIG. 7 corresponds to FIG. 4, but in flat layout, the cylinder assembly tends to rotate in direction indicated by arrow 95.

The rotational movement drives power shaft 46, which can be connected to any suitable device that is to be driven.

As soon as the cylinder assembly 40 has moved slightly from position shown in FIGS. 4 and 7, it will be seen that three of the cylinders will be under pressure and three will be exhausting, with the commutators set in their normal position for full speed and power. The balls roll along the cam surface so that no sliding is present and the device is relatively friction free. This eliminates serious wear and prolongs the life of the unit. Also, the motor works quietly.

The springs 53 keep the two balls in each of the power cylinders 42 spaced apart so that when pressure acts within the cylinder the balls will move toward opposite end caps. As can perhaps be best seen in FIG. 5, washers 96 are positioned at each end of each of the springs. The washers 96 are made of a material having a relatively low coefficient of friction, for example a plastic material. The low coefficient of friction between the balls and the washers makes it easy for the balls to roll.

The balls fit relatively tight within their bores so that there is very little leakage past the balls. However, if leakage does occur drains are provided at each of the end caps. An opening 100 in first end cap 45 has a fitting 101 screwed thereinto. A conduit 102 leads from the opening.

An opening 103 is provided in second end cap 48 and this has a fitting 104 threadably mounted therein. A conduit 105 is mounted in the fitting 104.

As perhaps best seen in FIG. 6 the conduits 105 and 102 are joined together in a single conduit 106 which in turn is open to both the pressure line 14 and the exhaust line 15. However, one way check valves 107 and 108 are provided so that pressure from line 14, for example, cannot act through conduit 106 back to the fluid motor. However, oil can flow out through check valve 108 into exhaust conduit 115.

If the operation of the device is reversed and conduit 15 is made a pressure conduit the check valve 108 will seat to prevent pressure from being exerted through conduit 106 and conduits 102 and 105. Check valve 107 will then open so that oil can be exhausted out through conduit 14.

It can be seen that the balls acting upon the inclined surfaces 87 can exert a considerable force to rotate the cylinder assembly 40. The angle of the inclined surface 87 can be changed to change the output torque of the motor. If more torque is desired the angle can be increased.

The commutator rings are supported by their respective O rings so that there is no bind between the surfaces of the commutator rings and the inner surface 21 of the outer housing 11. Also, the pressure acts evenly all the way around the commutator through annular passageway 23 so that the ring is centered by this pressure. There is no radial thrust on the device. This prevents galling and damage to the parts.

When the device is to be used as a pump, power is put into the unit through power shaft 46. Cylinder assembly 40 is rotated. The balls will be acted upon by the cams in opposite manner. In other words, the cams will move the balls in and out and cause a pumping action. The balls will pump oil out of the power cylinders when they are forced toward each other with each of the power cylinders and will intake oil when the springs force them down into the low points 56 of the cams. The pump is easily made variable volume by changing the position of the commutator rings with respect to each other.

The adjustment of the two commutator rings, as shown, makes the timing of the device easy and also by adjusting the rings the unit can be readily reversed in rotation.

Referring to FIGS. 8 through 12 and a second form of the present invention, parts identical with those in the first form of the invention will be identically numbered. In this form of the invention an outer housing 111 is tubular, as shown, and has a pressure port 112 and an exhaust port 113. The pressure port 112 is open to a pressure line 114 and the exhaust port 113 is open to an exhaust line 115. The housing has first and second end caps 116 and 117, respectively, which are threadably mounted as at 118 into the tubular housing. The end caps have provided bushings 120 and 121 and a cylinder assembly 40 is rotatably mounted in the bushings.

The cylinder assembly 40 as in the first form of the invention, includes a center cylindrical member 41 which has a plurality of longitudinally extending openings 42, six as shown. The openings 42 form power cylinders, as before. A stub shaft 43 is integral with the center cylindrical member 41, is rotatably mounted in bushing 121, and extends outwardly from the second end cap 117.

The power cylinders or openings 42 each have a separate pair of ball pistons 52, 52 mounted therein for sliding movement therealong, as in the first form of the invention. The balls are urged apart by springs 53 which ride on washers 96, as before. As can be seen there is an exhaust opening or hole 122 and a pair of pressure openings 123 and 124, respectively in each of the power cylinders.

In order to provide valve means to selectively introduce pressure into the power cylinders a commutator ring is utilized. A first main commutator ring 125 is slidably mounted within the interior of housing 111 and is slidably mounted over the cylinder assembly 41. The main commutator ring is held in place with suitable O rings 126. An exhaust commutator portion comprises a depressed portion which, together with the interior surface 129 of the outer housing 111, forms an annular exhaust port 113. In addition a plurality of exhaust valve-type slots 128 are provided through the commutator ring and are open to passageway 121 and aligned with the exhaust openings 122 in the cylindrical member 41. The valve-type slots are evenly spaced around the periphery of the commutator ring.

Main commutator ring 125 also has a second depressed portion, which, together with interior surface 129, forms an annular pressure passageway 130 which is open to pressure port 112. The ring is provided with a plurality of valve-type slots 131, open to the pressure passageway and aligned with the pressure openings 123 in the cylindrical member 41. The pressure passageway 130 and the exhaust passageway 127 are sealed from each other with the O rings 126.

An auxiliary commutator ring 132 is also mounted within the tubular outer housing 112 and is positioned next adjacent the pressure passageway of commutator ring 125. The auxiliary commutator ring is also contiguous with the end cap 117. The auxiliary commutator ring is relatively short and a single O ring 133 is utilized to prevent pressure from escaping out through the threaded portions 118 of end cap 117. Auxiliary commutator ring also defines an annular passageway 134 which is open to pressure port 112 and has plurality of openings 135 open to the pressure passageway and aligned with the openings 124 of the power cylinders.

A handle member 136 is integral with the edge portion of the auxiliary commutator ring and extends radially outwardly from the housing 111 through a provided slot. The auxiliary commutator ring is rotatable for a limited distance. As will be more fully explained later this permits the motor speed and power to be varied by extending the length of the openings in the pressure commutator and thereby allowing an operator to cause the oil supplied to the fluid device to be spilled or utilized completely, as desired.

As can be seen in FIG. 10 the end caps 117 and 116 have cam tracks indicated at 140 therein. The cam tracks in this form of the invention are comprised of five actuating lobes or cams having low points 141 and high points 142 between the low points. The low points 141 and high points 142 are joined by tapered ramp-like surfaces 143 and 144. The cam tracks, as shown have five low points and high points and each of the commutators has five slotted valve-like openings. In the previous form of the invention there were seven lobes in the cam and seven elongated openings in the commutators.

In this form of the invention, in order to provide for discharge of hydraulic fluid which may leak past the balls in the power pistons, a longitudinal hole 150 is provided in the center cylindrical member 41. A bleed groove 151 is defined in one end surface of the center cylindrical member and is open to a passageway 152 in the stub shaft 43. A fitting 153 is mounted in an end cap 154 for the stub shaft and a tube 155 is connected to the fitting 153.

Tube 155 may then be connected to the pressure and exhaust lines 115 and 114, through the same arrangement as that shown in FIG. 6 wherein tube 106 is connected through ball check valves 107 and 108 to lines 14 and 15. The passageway 150 will carry oil from adjacent the end cap 117 back through the groove 151, passageway 152 and out through tube 155.

As stated previously there are five lobes in each of the cam tracks 141, or in other words five low points 141 and five high points 142, and there are also five slots open to each of the annular passageways in the commutator rings. As can be best seen in FIG. 12, the valve slots of the commutator are positioned so that under normal working conditions when the trailing end of a pressure valve slot 131 is closing off pressure to one of the openings 123 of a power cylinder, a slot 128 of the exhaust commutator will just be opening to the hole 122 in the same power cylinder.

The relationship between the valve openings or slots of the commutators and the openings in the power cylinders is such that when pressure is subjected to each of the cylinders the balls are positioned so they will be forced outwardly against the ramp-like surfaces 143 of the cams and will roll down the surfaces. The reaction of the balls in turn will cause rotation of the cylinder assembly 40. Then, as perhaps can be seen best in FIG. 11, the slots are timed so that as the cylinder assembly 40 rotates to position where one pair of the balls are fully seated in the low points of their cams the pressure is being shut off to this cylinder and the exhaust port is open to this cylinder. As the balls start to go up inclined portions 144 of the opposite sides of the low portion of the cam the exhaust ports are open to the particular cylinder so that oil can escape from the cylinder and the balls can move inwardly as they roll up the inclined portions.

It is important in the making of the valve slots 131 that they are of configuration so pressure is not subjected to the cylinders in which the balls are moving inwardly. It is also important that the exhaust port is open to the power cylinders as the balls move inwardly along ramp surfaces 144.

In order to control the speed and power output of the motor or fluid device the auxiliary commutator ring 132 is rotatable with respect to the main commutator ring.

As can be seen in solid lines in FIG. 12 the valve slot openings 135 of the auxiliary commutator ring can be exactly axially aligned with the openings 131 of the pressure commutator. In this position the fluid motor will operate exactly as if only the main commutator ring was used. In other words the power output of the unit will be at a maximum and the speed also will be a maximum. However, if desired, the speed and power output of the motor can be reduced by rotating the commutator ring through use of handle 136. The handle can be moved to position shown in dotted lines in FIG. 8 and the valve slot openings 135 will be moved to position as shown in dotted lines in FIG. 12. It can be seen that in this position the slots 135 of the auxiliary commutator and slots 128 of the exhaust commutator will almost axially align. The openings 135 and 131 which are both open to the pressure port, extend for a larger number of degrees around the commutator rings and therefore each of the cylinders is under pressure for a longer period of time than normal. Fluid under pressure is being introduced into a power cylinder at the same time that the exhaust port is open to the same cylinder. This will cause a spillage or waste of fluid under pressure and consequently will reduce the power output and speed of the motor. As long as the exhaust port is open, the pressure in the cylinder will not be sufficient to force the ball against the cams. By adjusting the amount of movement of the slots 135 with respect to the slots 131 the spillage can be accurately controlled to obtain any desired speed and power.

It is also important that the low points and high points of the opposite end plate caps 116 and 117 are longitudinally aligned. This can be accomplished by rotating the end caps 116 and 117 in their threaded portions 118. Also end cap 116 can be held by a cap screw 156 extending through a slot in an ear 157 on end cap 116 and threaded into a boss 158. This is basically the same as that shown in the first form of the invention. This aids in aligning and adjusting the opposite end caps.

The second form of the invention can be used as a pump also by driving the cylinder assembly 40.

The action of the balls on the cams will be the same with five lobes as with seven lobes. The force tending to rotate the cylinder assembly will occur when the balls are forced against the ramp surfaces of the cam. The reaction will rotate the cylinder assembly, which, in turn, will cause output shaft 46 to rotate. The shaft can be connected to any suitable mechanism.

As many widely apparently different embodiments of this invention may be made without departing from the spirit and scope thereof, it is to be understood that we do not limit ourselves to the specific embodiments herein.

What is claimed is:

1. A pump or motor comprising:
   an outer housing having end caps at opposite ends thereof,
   a cylindrical member rotatably mounted with respect to said end caps,
   an intake commutator and exhaust commutator mounted within said outer housing and slidably mounted around said cylindrical member,
   each of said commutators comprising a separate central depressed portion forming an annular passageway,
   an intake line open to the annular passageway comprising said intake commutator,
   an exhaust line open to the annular passageway comprising said exhaust commutator,
   a plurality of axially extending cylindrical openings in said cylindrical member forming power cylinders,
   a pair of cam tracks each integral with one end cap and aligned with said power cylinders, each of said cam tracks being comprised of a plurality of lobes, defined by high points and low points with inclined surfaces joining adjacent high and low points the number of cam high points and the number of power cylinders being unequal, and a separate pair of pistons slidably sealingly mounted within each of said power cylinders, said pistons being adapted to engage said cam tracks, said cylindrical member having a separate pair of openings open to each of said power cylinders and aligned with said intake passageway and said exhaust passageway respectively, said commutators having openings therein of configuration and spacing so that the interior of said power cylinders are alternately open to said intake line and open to said exhaust line for predetermined degrees of rotation of said cylindrical member.

2. The combination as specified in claim 1 wherein said commutators are comprised as two separate annular rings radially adjustable with respect to each other.

3. The combination as specified in claim 1 and resilient means urging said pistons apart.

4. The combination as specified in claim 1 wherein said intake and exhaust passageways are formed on a unitary annular commutator ring positioned around said cylindrical member, and wherein the combination includes an auxiliary commutator ring having a depressed portion forming a third annular passageway, said third passageway being open to said intake opening, said auxiliary commutator ring having elongated slots defined therethrough and open to said third passageway, said auxiliary commutator ring being rotationally adjustable with respect to the unitary commutator ring, said cylindrical member having a separate opening leading from each of said power cylinders and positioned in alignment with the slots in said auxiliary commutator ring, the slots in said auxiliary commutator ring corresponding in size and radial positioning to the openings in the unitary commutator ring which opens into said first annular passageway.

5. The combination as specified in claim 1 wherein said end caps are rotationally adjustable with respect to each other.

6. A pump or motor comprising:

an outer housing having end caps at opposite ends thereof, commutator means slidably mounted within said outer housing, a plurality of annular resilient rings engaging said commutator and the interior of said outer housing, said commutator means having two longitudinally spaced central depressed portions forming annular intake and exhaust passageways, respectively, an intake line open to the intake passageway, an exhaust line open to the exhaust passageway, a cylindrical member rotatably mounted with respect to said end caps and in sliding relationship with said commutator means, said cylindrical member being provided with a plurality of longitudinally extending cylindrical openings forming power cylinders, said commutator means including an annular wall portion positioned around said central cylindrical member and between said cylindrical member and said passageways, a pair of cam tracks axially aligned with said power cylinders, each of said cam tracks being fixed to one of said end caps, a separate pair of balls sealingly slidably mounted within each of said power cylinders, said balls being adapted to engage said cam tracks, resilient means in each of said power cylinders urging said balls apart, said cylindrical member having a separate pair of radially extending openings open to each of said power cylinders, one opening of each pair being aligned with said intake passageway and the other opening of each pair being aligned with said exhaust passageway, said annular wall portion of said commutator having valve openings therethrough of configuration and spacing so that said power cylinders are alternately open to the intake passageway and open to said exhaust passageway as said cylindrical member rotates, said power cylinders being open to said intake passageway when said balls move axially outwardly along an inclined portion of the cam track and being open to said exhaust passageway to permit said balls to move axially inwardly along oppositely extending inclined portions of said cam track.

7. The combination as specified in claim 6 and conduit means open to each of said cam tracks to provide for drainage of oil which leaks past said ball shaped pistons.

8. The combination as specified in claim 7 wherein said end caps are rotationally adjustable with respect to each other.

9. A fluid pump or motor comprising an outer housing having closed ends, said outer housing having an intake opening and an exhaust opening, a cylindrical member rotatably mounted within said outer housing, said cylindrical member being provided with at least four longitudinally extending power cylinder openings, each of said power cylinders having a pair of radial passageways leading therefrom, a cam track having a plurality of lobes forming high points and low points fixed with respect to opposite ends of said housing and positioned to be aligned with said power cylinder openings in said cylindrical member when said cylindrical member rotates, the number of power cylinder openings in said cylindrical member being different from the number of lobes on said cam track by one, piston means mounted for longitudinal movement in each of said power openings of said cylindrical member, and annular valve means other than the piston means and functioning independently of the piston means associated with said cylindrical member to cover a first of said passageways and uncover a second of said passageways in each power cylinder when the piston means of that power cylinder move longitudinally inwardly under action of said cam means as said cylinder member rotates, and to uncover said first and cover said second opening in each power cylinder when the piston means in that power cylinder moves outwardly the valve means and cylindrical member being mounted so that they are rotatable relative to each other during operation thereof.

10. The combination as specified in claim 9 and conduit means open to each of said cam tracks to provide for drainage of oil which leaks past said piston means.

11. The combination as specified in claim 9 wherein said annular valve means includes two separate co-axial commutator members, one associated with the intake opening and the other associated with the exhaust opening, said commutators being rotationally adjustable with respect to each other.

12. A pump or motor comprising an outer housing having closed ends, said outer housing having an intake opening and an exhaust opening;

a cylindrical member rotatably mounted within said outer housing, said cylindrical member being provided with a plurality of longitudinally extending power cylinder openings;

a cam track having a plurality of lobes forming high points and low points fixed with respect to opposite ends of said housing and positioned to be aligned with said power cylinder openings in said cylindrical member when said cylindrical member rotates, the number of power cylinder openings in said cylindrical member and the number of lobes on said cam track being unequal;

piston means mounted for longitudinal movement in each of said power cylinder openings of said cylindrical member; and valve means associated with said cylindrical member, said valve means comprising an inlet commutator and exhaust commutator mounted within said outer housing and slidably mounted around said cylindrical member, each of said commutators comprising a separate central depressed portion forming an annular passageway, said inlet opening being open to the annular passageway comprising said inlet commutator, said exhaust opening being open to the passageway comprising said exhaust commutator, said cylindrical member having a separate pair of radial openings open to each of the power cylinders and aligned with said inlet passageway and said exhaust passageway, respectively, said commutators having openings therein of configuration and spacing so that the power cylinders are alternately open to said inlet opening and open to said exhaust opening.

13. A fluid device comprising an outer housing having closed ends, said outer housing having a pressure inlet opening and an exhaust outlet opening, a cylindrical member rotatably mounted within said outer housing, said cylindrical member being provided with a plurality of longitudinally extending power cylinder openings therein, a cam track having a plurality of lobes forming high points and low points fixed with respect to opposite ends of said housing and positioned to be aligned with said power openings in said cylindrical member when said cylindrical member rotates, the number of power openings in said cylindrical member and the number of lobes on said cam track being unequal, piston means mounted for longitudinal movement in each of said power openings of said cylindrical member, a source of fluid under pressure open to said pressure inlet opening, annular valve means separate from the piston means associated with said cylindrical member to selectively direct fluid under pressure to each of said power openings and alternately connect said power openings to said exhaust opening as said cylindrical member rotates, said valve means comprising a pressure commutator and exhaust commutator mounted within said outer housing and slidably mounted around said cylindrical member, each of said commutators comprising a separate central depressed portion forming an annular passageway, said inlet opening being open to the annular passageway comprising said pressure commutator, said exhaust outlet opening being open to the passageway comprising said exhaust commutator, and said cylindrical member having a separate pair of openings open to each of said power cylinders and aligned with said pressure passageway and said exhaust passageway, said commutators having openings therein of configuration and spacing so that said power cylinders are alternately subjected to pressure and open to said exhaust outlet opening.

14. A fluid device comprising an outer housing having closed ends, said outer housing having a pressure inlet opening and an exhaust outlet opening, a cylindrical member rotatably mounted within said outer housing, said cylindrical member being provided with a plurality of longitudinally extending power cylinder openings therein, a cam track having a plurality of lobes forming high points and low points fixed with respect to opposite ends of said housing and positioned to be aligned with said power openings in said cylindrical member when said cylindrical member rotates, the number of power openings in said cylindrical member and the number of lobes on said cam track being unequal, piston means mounted for longitudinal movement in each of said power openings of said cylindrical member, a source of fluid under pressure open to said pressure inlet opening, annular valve means separate from the piston means associated with said cylindrical member to selectively direct fluid under pressure to each of said power openings and alternately connect said power openings to said exhaust opening as said cylindrical member rotates, said valve means comprising commutator means mounted within said outer housing and slidably mounted around said cylindrical member, said commutator means including at least two central depressed portions forming first and second annular passageways, said pressure inlet opening being open to a first of said annular passageways, said exhaust outlet opening being open to a second of said passageways, and said cylindrical member having a separate pair of openings open to each of said power cylinders, one opening of each pair being aligned with said first passageway and the other opening of each pair being aligned with said second passageway, said commutator means having openings therethrough positioned in alignment with each of said passageways and being of configuration and spacing so that said power cylinders are alternately in fluid conducting connection with the intake opening and said exhaust opening.

15. The combination as specified in claim 14 wherein said first and second passageways are formed on a unitary annular commutator ring positioned around said cylindrical member, and wherein the combination includes an auxiliary commutator ring having a depressed portion forming a third annular passageway being open to said pressure inlet opening, said auxiliary commutator ring having elongated slots defined therethrough and open to said third passageway, said auxiliary commutator ring being rotationally adjustable with respect to the unitary commutator ring, said cylindrical member having a separate third opening leading from each of said power cylinders and positioned in alignment with the slots in said auxiliary commutator ring, the slots in said auxiliary commutator ring corresponding in size and radial positioning to the openings in the unitary commutator ring which opens into said first annular passageway.

References Cited by the Examiner

UNITED STATES PATENTS

| | | | |
|---|---|---|---|
| 2,617,360 | 11/1952 | Barker | 103—162 |
| 2,642,809 | 6/1953 | Born et al. | 103—162 |
| 2,997,962 | 8/1961 | Wysong | 103—162 |
| 3,079,869 | 3/1963 | Purcell | 103—162 |

FOREIGN PATENTS 1,199,870   6/1959   France.

SAMUEL LEVINE, Primary Examiner.

FRED E. ENGELTHALER, Examiner.

P. E. MASLOUSKY, Assistant Examiner.